United States Patent [19]
Friedell et al.

[11] Patent Number: 5,491,508
[45] Date of Patent: Feb. 13, 1996

[54] PC VIDEO CONFERENCING

[75] Inventors: Mark Friedell, Arlington; Martin L. Moeller, Watertown, both of Mass.

[73] Assignee: Lotus Development Corporation, Cambridge, Mass.

[21] Appl. No.: 215,501

[22] Filed: Mar. 21, 1994

[51] Int. Cl.$^6$ .................................................. H04N 7/10
[52] U.S. Cl. ................. 348/16; 348/14; 348/12; 455/5.1
[58] Field of Search .................... 348/6, 8, 12, 13, 348/14, 15, 16, 17; 455/3.1, 5.1, 6.3

[56] References Cited

U.S. PATENT DOCUMENTS

| | | |
|---|---|---|
| 4,290,142 | 9/1981 | Schnee et al. .......................... 455/3.1 |
| 4,491,983 | 1/1985 | Pinnow et al. ....................... 348/10 X |
| 4,710,917 | 12/1987 | Tompkins et al. . |
| 4,885,747 | 12/1989 | Foglia . |
| 5,099,510 | 3/1992 | Blinken, Jr. et al. . |

FOREIGN PATENT DOCUMENTS

WO93/07727  4/1993  WIPO .

*Primary Examiner*—Victor R. Kostak
*Assistant Examiner*—Nathan J. Flynn
*Attorney, Agent, or Firm*—Fish & Richardson

[57] ABSTRACT

A video signal distribution hub for a video conferencing network in which workstations generate RF video signals. The hub includes a plurality of workstation ports, a plurality of hub ports, a first circuit module and a second circuit module. The first circuit module generates an output signal for each of the workstation ports by combining all of the video signals received over the input lines of all of the workstation ports and all of the hub ports to generate a combined signal. The video signal sent to the workstation port is derived from the combined signal. The second circuit module includes an RF amplifier for each of the hub ports. For each of the hub ports, the second circuit module combines the video signals received over the input lines of all of the workstation ports with the video signals received over the input lines of all of the other hub ports to generate a composite signal that is supplied to the input of the RF amplifier for that hub port.

16 Claims, 3 Drawing Sheets

PC VIDEO CONFERENCING

BACKGROUND OF THE INVENTION

The present invention relates to an architecture for implementing video conferencing through personal computers (PC's) or workstations over a network.

An approach to implementing video conferencing employs an architecture that is similar to that which cable TV companies use to distribute their TV signals to subscribers. Each user workstation that wishes to transmit over the network is assigned a channel from among a limited number of available channels, e.g. channels 2–50.

For a video conferencing network to be practical, the video signal from any given workstation must be able to reach all other workstations on the network, regardless of how far they are from the sending workstation. To accomplish this, some video distribution systems use what is referred to as a mid band split. According to this approach, the available channels are divided into two groups, namely, a low group (e.g. channels 2–25) and a high group (e.g. channels 26–50). Each workstation on the network sends its video signal to a distribution unit (also referred to as a head end unit) located elsewhere on the network. The head end unit receives all workstations signals transmitted on the low group channels, shifts them up to a corresponding high group channels, and then sends them back out over the network. For example, the head end unit may shift channel 2 up to channel 26, channel 3 up to channel 27, etc. The high group channel signals that are broadcast by the head end unit are periodically boosted by amplifiers that are spaced along the length of the network.

In such a network, each workstation sets its output signal level high enough so the signal will reach the head end unit with sufficient strength. The head end unit on the other hand sets its broadcast signal strength based only on how far the nearest boost amplifier is from it. In addition, the boost amplifiers are spaced such that signal strength at the output of an amplifier will not exceed some maximum acceptable level. In this way, the boost amplifiers if properly located make sure that all workstations can receive sufficiently strong signals while at the same time the workstations that are closest to the head end unit (or an upstream boost amplifier) are not overwhelmed by the signal strength of the broadcast signal.

This approach has a number of drawbacks. Since the head end unit is relatively expensive, the up front costs associated with installing such a system can be sizable. In addition, signal quality tends to degrade significantly as the network grows in physical size and in its number of users. Each of the signals converging on the head end unit from the workstations adds noise to the broadcast signal. In addition, each boost amplifier adds noise to the signal when it amplifies it. Thus, the farthest workstations from the head end unit suffer the most in signal degradation.

SUMMARY OF THE INVENTION

In general, in one aspect, the invention is a video signal distribution hub for a video conferencing network in which workstations generate RF video signals. The hub includes a plurality of workstation ports, each of which includes an input line for receiving a video signal from a workstation connected thereto and an output line for sending a video signal to a workstation connected thereto. The hub also includes a plurality of hub ports through which other hubs can be connected to that hub. Each of the hub ports includes an input line for receiving video signals from a hub connected to that port and an output line for sending video signals to the hub connected thereto. The hub also includes a first circuit module that generates an output signal for each of the workstation ports. The first circuit module operates by combining all of the video signals received over the input lines of all of the workstation ports and all of the hub ports to generate a combined signal. The output signal for each of the workstations ports is derived from the combined signal. The hub also includes a second circuit module including an RF amplifier for each of the hub ports. For each of the hub ports, the second circuit module combines the video signals received over the input lines of all of the workstation ports with the video signals received over the input lines of all of the other hub ports to generate a composite signal that is supplied to an input of the RF amplifier for that hub port.

Preferred embodiments include the following features. The output signals for all of the workstation ports carry the same video information. The distribution network within the first circuit module includes a plurality of transmitters, each of which is connected to the output line of different workstation port. Each of the transmitters includes a tuner in series with a modulator. In one embodiment, the tuners in transmitters are fixed channel tuners and the modulators are fixed channel modulators that are set to the same channel. In another embodiment, tuners in the transmitters are channel selectable tuners. The hub also includes a central control unit that is connectable to a computer network and that controls the channel selection of the channel selectable tuners.

Also in preferred embodiments, the first circuit module includes a combining module that combines the video information contained in the video signals received over the input lines of all of the workstation ports to generate an intermediate signal. And the second circuit includes a combiner circuit for each hub port, which combines the intermediate signal with the video signals received over the input lines of all of the other hub ports to generate the composite signal for that port. The first circuit module also includes a plurality of receivers, each of which is connected to the input line of different workstation port, each of which includes a tuner in series with a modulator. The tuners in the receivers are fixed channel tuners that are all set to the same channel. The modulator in each receiver is a channel selectable modulator. The hub further includes a central control unit that controls the channel selection of the channel selectable modulators.

The invention has a number of advantages in comparison to conventional approaches to implementing video conferencing. Wiring layout is much simpler and thus more convenient to install. The network is readily extendable thus new workstations can easily be added to the network merely by adding another hub. Existing wiring need not be disturbed to connect new workstations in the same or other buildings. The overall system is more robust and easier to set up and balance. Load balancing once done for existing connections need not be changed when new connections are added. In addition, it is easy to achieve a level of security that is commensurate with what users typically expect from their PBX systems.

Also, a video conferencing network built in accordance with the present invention does not require a large financial investment in a head end unit and sophisticated distribution electronics. In other words, a significantly lower per user investment is required in comparison to other alternative approaches.

Other advantages and features will become apparent from the following description of the preferred embodiment and from the claims.

DESCRIPTION OF THE PREFERRED EMBODIMENTS

Figure 1:
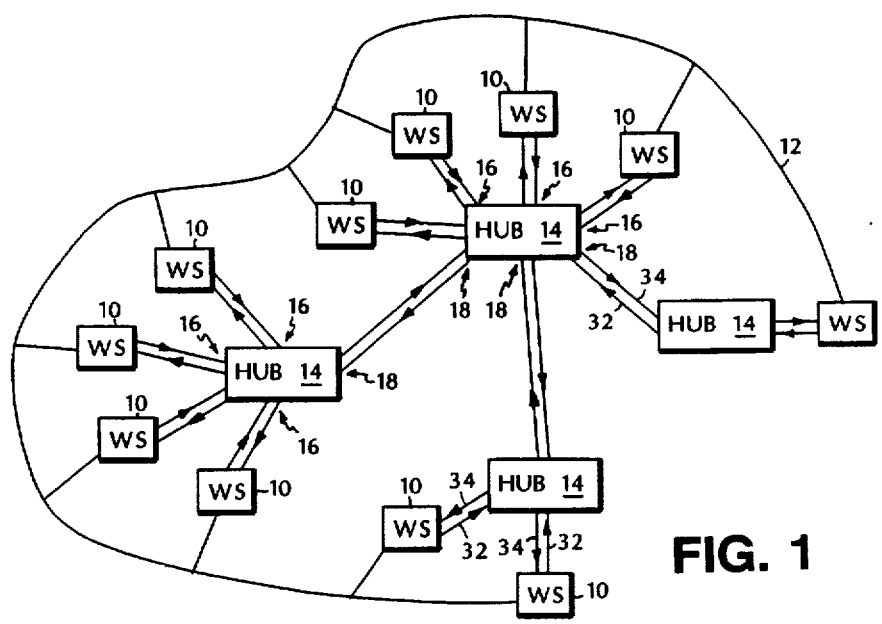
FIG. 1 is a block diagram of a PC video conferencing network that embodies the invention.

Referring to FIG. 1, a video conferencing network in accordance with the invention includes a plurality of workstations 10 which are each connected to a local area network (i.e., LAN 12). Each workstation 10 is also connected to a separate video conferencing network over which video conferencing signals are distributed. The video conferencing network is made up of a group of interconnected local hubs 14, each one with a plurality of workstation ports 16 to which individual workstations may be connected. Each local hub 14 also includes a plurality of expansion ports 18 through which the hub can be connected to another hub to thereby expand the size and reach of the network.

Figure 2:
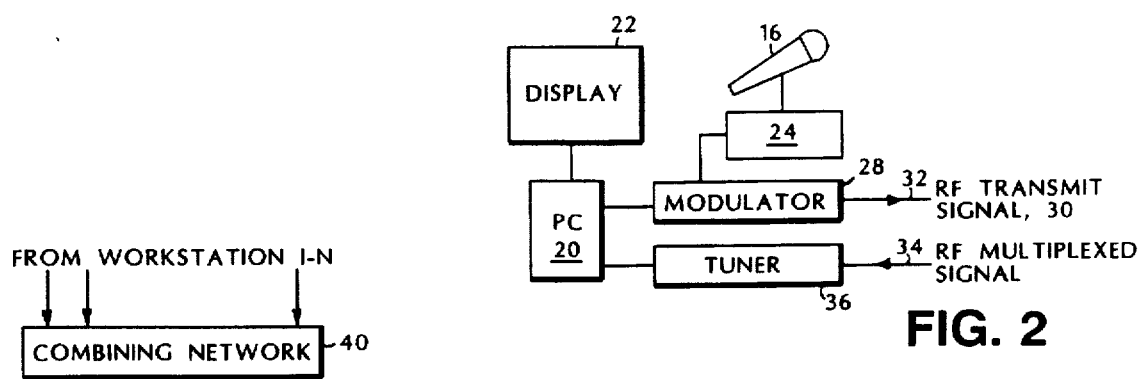
FIG. 2 is a functional block diagram of a workstation including a PC and video camera.

As shown in FIG. 2, each workstation 10 includes a personal computer (PC) 20, a video display 22, and a video camera 24 and microphone 26 mounted on the video display housing. Video camera 24 generates an image of the user when the user is sitting at workstation 10 and microphone 26 picks up the user's voice. The output signals from video camera 24 and from microphone 26 pass to a modulator unit 28 which produces an television RF transmit signal 30 on a selected one of a group of available channels (e.g. channels 2–50). In the described embodiment, each workstation 10 is assigned a different channel. The RF transmit signal 30 is sent over a coaxial cable 32 to a local hub 14 through which the workstation is connected to the video conferencing network. Each modulator unit 28 includes an output RF amplifier (not shown) for adjusting the strength of the RF transmit signal to account for the distance that the workstation is from its hub. Over another coaxial cable 34, the hub sends back to the workstation a RF signal 36 that is a frequency multiplexed signal containing all of the RF transmit signals being sent over the network by other workstations. In other words, in the described embodiment, each workstation on the video network receives the video signals of all other workstations on the network (including its own video signal). The received multiplexed RF signal is processed by a video tuner unit 36 that selects (i.e., tunes to) the particular channel of interest to the user at the workstation.

A local hub 14 distributes the same signal to each of the workstations that are connected to it and it supplies a different signal to each of the hubs to which it is connected. The signal that the hub sends to each workstation is the combination of all RF transmit signals received at that hub from workstations connected to the hub plus all signals received from other hubs directly connected to that hub. At any given hub, the signal sent to the neighboring hub is different from the signal sent to the workstations for that hub only to the extent that it does not contain the signal received from the neighboring hub. That is, a hub does not send back to a neighboring hub the signal which it receives from that neighboring hub. This avoids creating a closed signal loop in the network.

Figure 3:
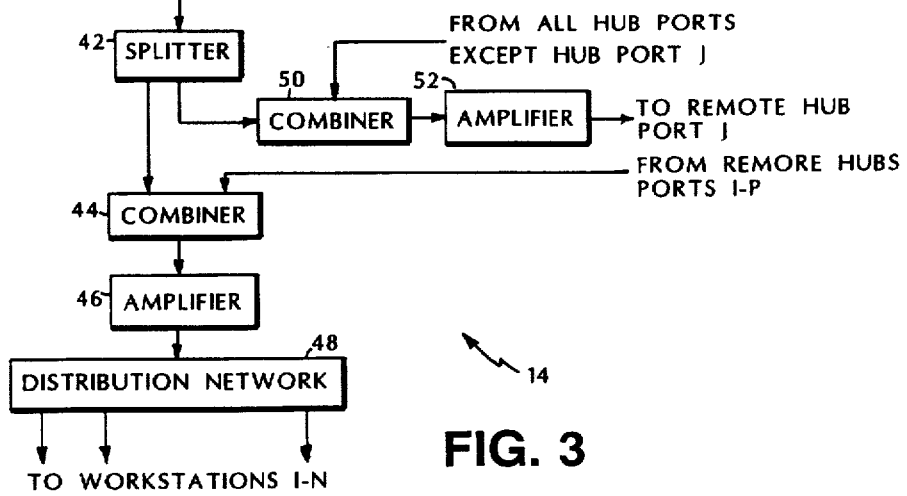
FIG. 3 is a functional block diagram of a passive hub that can be used in the network shown in FIG. 2.

The details of a hub with N ports for workstations and P ports for hub connections will now be described. Referring to FIG. 3, hub 14 includes a combining network 40 that combines all of the RF transmit signals received from workstations connected to the hub to generated a frequency multiplexed output signal. The output signal of combining network 40 passes to a splitter unit 42 that produces P+1 identical output signals. One of the P+1 output signals from splitter unit 42 passes to another combiner unit 44 which combines that signal with the P signals received through the P hub ports. The output of combiner unit 44 passes through an RF amplifier 46 to a distribution network 48 that generates N identical output signals, each sent to a different one of the N workstation ports through which the workstations are connected to that hub.

The other P signals from splitter unit 42 are each directed to a different hub port. FIG. 3 illustrates how that signal is handled in the case of hub port J. The signal that goes to hub port J first passes through another combiner 50 which combines it with the received signals from all hub ports other than hub port J. The output signal from combiner 50 then passes through an RF amplifier 52 and on to the output side of hub port J. Thus, as previously noted, the neighboring hub receives all signals arriving at the local hub except the signals sent to the local hub by that neighboring hub. Though not shown in FIG. 3, the circuitry for generating output signals for the other hub ports is the same.

When physically connecting a new workstation to a hub, its signal level must be set so that the signal arriving at the hub is balanced, i.e., it has the same strength as the other workstation signals with which it will be multiplexed the hub must be balanced, i.e., it must be adjusted to have the same signal strength as the signals received from the other workstations connected to the hub. In the just described embodiment, this is done by adjusting the amplifier in the modulator unit at the workstation until the desired signal strength at the hub is achieved.

In hub-to-hub connections the signal balancing is done in the same way. Thus, once a hub-to-hub connection is properly balanced, it need not be disturbed when new workstations are added to either of the hubs.

Note that in this embodiment, video signals for all video channels are broadcast throughout the network regardless of whether they contain active communications. In addition, channels are preassigned to users. Thus, the number of users that can use the network is limited to the number of available channels.

The video conferencing connections are controlled by software that is running over the network. To establish a connection with another user on the network, the initiating party sends a message to the called party. The message alerts the called party of a desired connection workstation by displaying a message of the display screen identifying the initiating party and offering the called party to accept the connection through a menu selection for example. If the called party accepts the connection by selecting the appropriate option, the workstation sends an accept message to the initiating workstation and simultaneously tunes its video tuner to the channel that is assigned to the initiating party to display the initiating party's video signal on the display screen.

At the initiating party's workstation, when the transmitted accept message is received, the initiating party's workstation tunes its tuner to the called party's video channel and the connection is made.

To terminate the connection, either party may initiate a disconnect command through their workstation. In response, that party's workstation immediately detunes its tuner (e.g. shifts its tuning frequency away from the other party's transmission frequency) and it sends a disconnect message to the other party. When the other party's workstation receives the disconnect message, its tunes its tuner away from the first party's frequency.

The control software also implements a security feature which automatically disconnects the parties from a conference call if the communications channel is severed. It does this through a protocol for exchanging "heart beats" over the network. When a video conference connection has been established, the two workstations periodically send each other heart beats, i.e., any characteristic signal confirming that the connection is still alive. If either workstation does not receive a heart beat within a predetermined period of time, it assumes that the connection has been broken and it automatically tunes its video tuner away from the other party's channel.

An alternative embodiment of the invention provides a self balancing capability and offers better security than the above-described embodiment. The alternative embodiment uses an active hub; whereas the previously described embodiment used a totally passive hub. Also, in the alternative embodiment, users are not preassigned channels but rather channels are assigned on the fly based upon availability and the assignment last only for the duration of the connection.

In the alternative embodiment, each workstation connected to a hub transmits its video signal over the same channel, e.g. channel 2, and it receives its video signal over another channel, e.g. channel 4. The hub demodulates the received signal to produce a video signal and an audio signal at baseband. A programmable RF modulator within the hub then moves that baseband signal up to a selected channel, selected on the basis availability. Since video signals coming from the workstation are on channel 2 and video signals going to the workstation are on channel 4, a single coaxial cable can be used instead of the two cables shown in FIG. 2.

Figure 4:
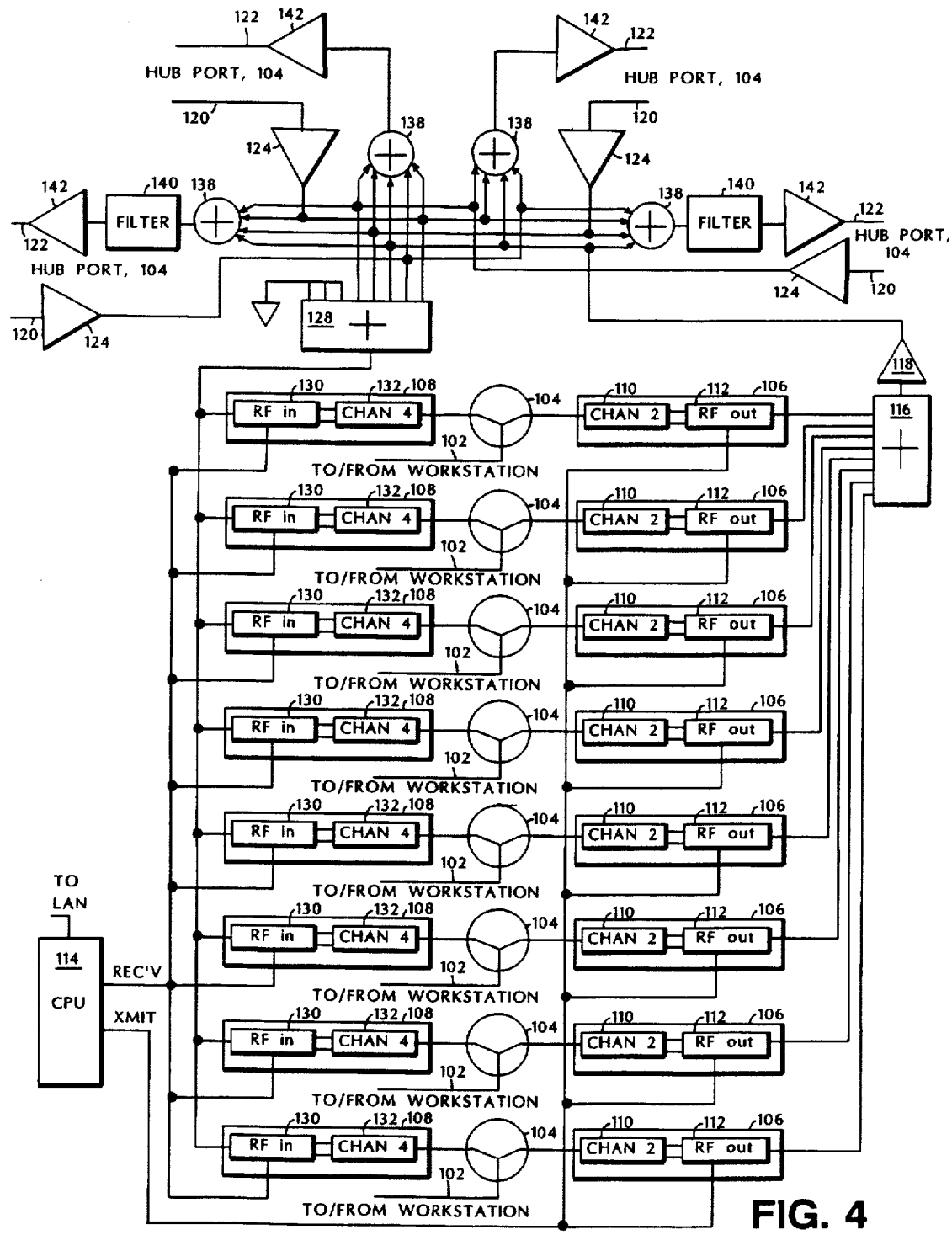
FIG. 4 is a functional block of an active hub that can be used in the network shown in FIG. 2.

Referring to FIG. 4, an active hub 100 in accordance with the described embodiment includes eight workstation ports 102 and four hub ports 104. For each workstation port 102, active hub 100 includes a coupler 104 to which the coaxial cable from the workstation is connected, a receiver circuit 106 which receives video signal workstation, and a transmitter circuit 108 which sends a video signal to the workstation. Each receiver circuit 106 includes a fixed frequency demodulator circuit 110 and a programmably tunable modulator circuit 112. The fixed frequency demodulator circuit 110, which is tuned to channel 2, converts the channel 2 RF signal received from the workstation down to baseband. It includes an AGC circuit (not shown) which adjusts its gain to compensate for the strength or weakness of the received signal so as to produce a predetermined signal level for the resulting baseband signal. The programmably tunable modulator circuit 112 then shifts that baseband signal up to an appropriate RF channel.

Shifting down to baseband has several advantages. First, filtering of the received signal may be necessary particularly if the RF modulators in the workstation are not of high quality and thus introduce noise. Low pass filtering can easily be included to deal with the low quality of the workstation signal. A second advantage is that by bringing all received signals to a predetermined level at baseband, one need not worry about having to separately balance the output signals of the RF modulators 112.

The output signals from all of the receiver circuits 106 pass to a combiner circuit 116 which combines them to produce a multiplexed RF signal. This signal is then amplified by an amplifier 118, combined with signals from all other hub ports, and sent to the transmitter circuits 108 for the workstation ports 102.

Each hub port 104 includes an input side 120 and an output side 122, each of which can be connected by a coaxial cable to a corresponding hub port of a neighboring hub to extend the network. The signals received through the input side of the hub port (i.e., the video signals from the neighboring hub) pass through an AGC amplifier 124 to produce a balanced signal within the hub (i.e., balanced with respect to the other signals with which it will be combined as described below).

Another combiner circuit 128 combines the balanced signals from the AGC amplifiers 124 (i.e., the signals received through the hub ports) and the multiplexed RF signal from the receiver circuits 106 (i.e., the video signals received through the workstation ports) and passes the resulting multiplexed signal to the input side of each transmitter circuit 108.

Each transmitter circuit 108 includes a programmably tunable demodulator circuit 130 and a fixed frequency modulator circuit 132. The demodulator circuit 130, which is tuned to a selected channel, shifts received signal on that channel signal down to baseband. The fixed frequency modulator 132 then shifts the baseband signal back up to channel 4 and sends it the workstation through the coupler 104.

Each hub 100 also includes a combiner circuit 138 for the output side of each hub port 104. The combiner circuit 138 combines the balanced signals received through each of the other hub ports with the multiplexed RF signal from the receiver circuits 106 and passes the resulting signal optionally through a filter 140 then through an amplifier 142 to the output side of that hub port 104.

The control of the tunable circuits in the hubs is distributed. Each hub includes its own CPU 144 which communicates with the CPU's of the other hubs over the computer network. The CPU's respond to workstation requests for video conferencing channels, allocate channels among workstations, determine which workstations are allowed to become part of any given video conferencing connection, block a workstation's video signal from getting onto the network when the workstation is inactive, and prevent a workstation from receiving any video signal unless a connection is accepted by the "present owner" of the channel, i.e., the party to whom the channel was assigned. The CPU's keep track of available channels (i.e., unused channels) and dynamically assign them on an as needed basis. For times when video conferencing requests outnumber the total number of available channels, the CPU's can employ an arbitration mechanism for determining the assignment of channels.

When a workstation does not have an active PC video conferencing connection, demodulator circuit 130 is tuned to no channel and the workstation does not receive a video signal.

When a workstation desires to initiate a video connection with another party, the software control mechanisms for accomplishing this are similar to those previously described. There is an exchange of messages between the workstations of the initiating party and the called party. If the called party accepts the call, the CPU allocates a different unused channel to each party and tunes the relevant modulator circuits 112 accordingly. The assignment of the channels to the parties are then noted so that the CPU's in all hubs will recognize that the channels are no longer available. To receive the video signals, the demodulator 130 for the called party is tuned to the channel used by the initiating party and the demodulator 130 for the initiating party is tuned to the channel used by the called party. Note that in this embodiment, all tuning occurs within the hub and the workstations simply transmit on channel 4 and receive on channel 2.

Also note that the alternative embodiment is self balancing. The only requirement is that the output signal of the RF modulator at the workstation must be set to produce a sufficient signal level at the hub. In practice, this will mean that the level should be set high enough to accommodate the longest stretch of cable that will likely be used in the system. If that requirement is satisfied, the AGC circuit within the demodulator circuit 130 of the corresponding receiver in the hub will automatically adjust its gain to produce a baseband signal with the required amplitude.

Similarly, for connections between hubs, the gain of amplifier 142 must be set sufficiently high to accommodate whatever the maximum length of cable that will be used to interconnect hubs. Then, the AGC circuit within amplifier 124 on the input side of a hub connection will set its output level to balance the received signal.

Resources other than workstations can be connected to a workstation port. For example, a gateway for another wide area video conferencing system could be connected to a hub. Or a commercial cable TV source or a private news or financial wire service could be connected to the hub. If such connections were used, certain channels would ba allocated to such services and users would be given access to them on whatever basis was desired.

Other embodiments are within the following claims. For example, the embodiment of FIG. 2 can be modified to increase the security of the network but at less expense than might be associated with the embodiment of FIG. 4. In this third embodiment, each workstation receives its video signal from the hub over a fixed frequency, e.g. channel 3, and it transmits over a selectable frequency. Each workstation is also assigned a different channel. To send a video signal to another workstation, the sending workstation sends its signal over the channel assigned to receiving workstation. The hub performs the appropriate filtering and frequency shifting to convey the transmitted video signal to the receiving party over channel 3.

In the alternative embodiment, the tuner 56 at each workstation is a fixed frequency tuner that is tuned to channel 3. The modulator 28 at each workstation is an agile modulator that can be tuned under software control to any of the permitted video transmission frequencies (e.g. the channel assigned to the receiving workstation). Within the hub, the distribution network 48 of FIG. 2 is modified so that only the appropriate video signal is passed on to the receiving workstation.

Figure 5:
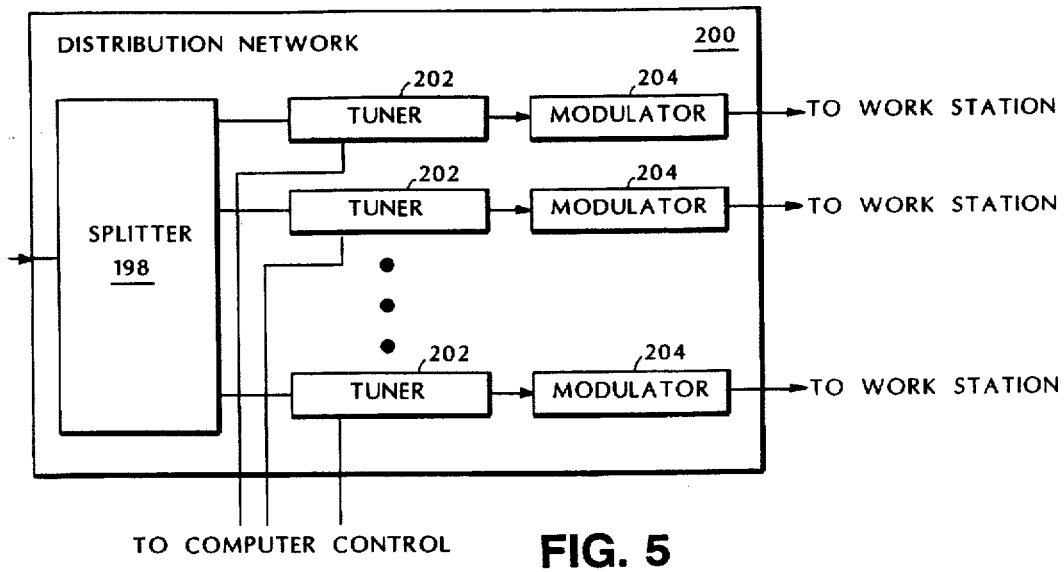
FIG. 5 is a block diagram of a distribution network of that is used in a modified version of FIG. 2.

Referring to FIG. 5, a modified distribution network 200 includes a splitter circuit 198 that produces N versions of the frequency multiplexed input signal (i.e., the signal from amplifier 46 of FIG. 2). It also includes a tuner-modulator pair (see tuner 202 and modulator 204) for each of the N workstation output ports, i.e., the port through which signals are sent to the attached workstation. Each tuner-modulator pair receives an output from the splitter circuit 198, tunes to the channel assigned to the attached workstation, and shifts the video information on the tuned frequency to channel 3 so that it can be passed to the attached workstation. Thus, each tuner-modulator pair operates as a filter which filters out all video signals but the one intended for the attached workstation. Note that for purposes of flexibility within the hub it may be desirable that tuners 202 be tunable under software control so that the workstation frequency assignment can be changed easily.

Figure 6:
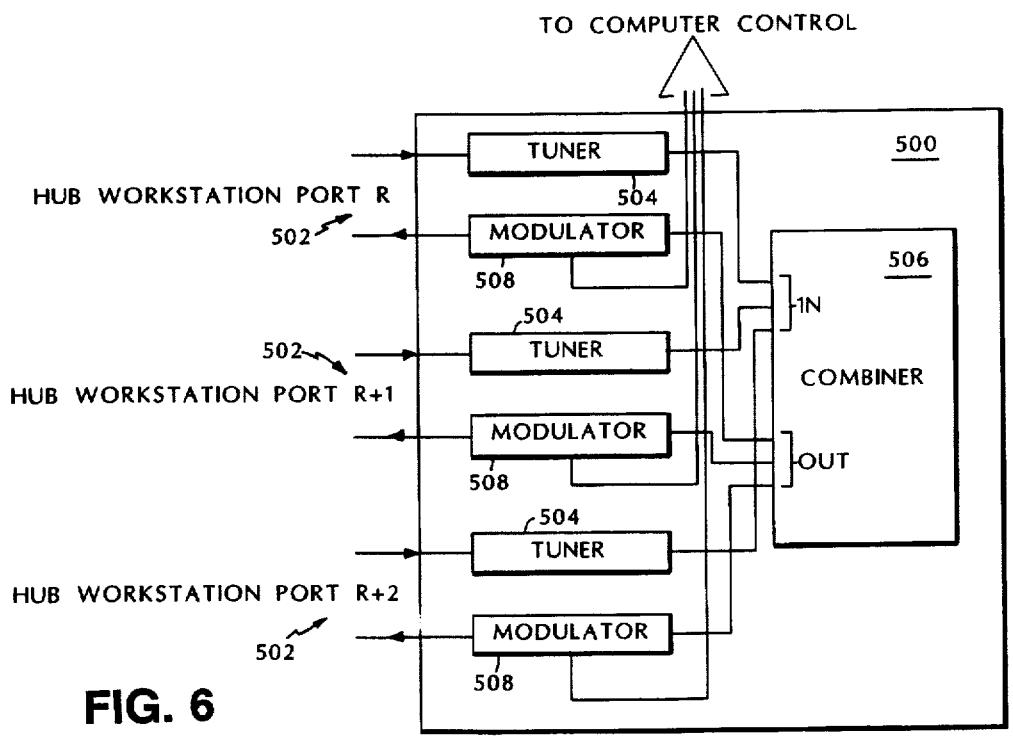
FIG. 6 is block diagram of a bridge circuit for combining channels to produce a composite video signal.

In a system which uses the circuit of FIG. 5, a conference call involving more than two parties can easily be accomplished with the aid of a bridge circuit 500 such as is illustrated in FIG. 6. Bridge circuit 500 combines video signals from three sources into a single composite video signal. The composite video signal when displayed contains three panels, each displaying a different one of the three input video signals.

Bridge circuit 500 has three ports 502 each of which is connected to a different workstation port of the hub. Each bridge port includes a fixed frequency tuner circuit 504 that is tuned to channel 3 and a tunable modulator circuit 508 that is computer controlled. The incoming signal at each port passes to tuner circuit 504 where it is demodulated and then passed onto a combiner circuit 506. The combiner circuit 506 combines the demodulated signals from the three tuner circuits (i.e., the video signal from each of the bridge ports) and produces the composite signal described above. The composite signal is sent to each of the three tunable modulator circuits 508 which modulates the composite video signal to a selected channel and sends it back to the hub.

The bridge circuit functions as a "virtual conference room" for participants of a three-way video conference call. A workstation initiates the video conference through the bridge circuit by requesting access to its resources. If the bridge is available, the control computer (not shown) assigns one of its channels to the workstation which then sends its video signal over that assigned channel. The other participants to the conference call are each assigned a different one of the other bridge circuit channels. Thus, each participating workstation sends its video signal to the bridge over the assigned channels. The video signals arriving at the bridge circuit from the participants are combined to form the composite signal and the composite signal is sent back to each of the participants over the channels assigned to those participants. When the composite signal is displayed at the workstation, each participant appears in a different panel on the display screen.

A similar bridge circuit can be used in the first embodiment shown in FIG. 3. In that case, however, the tuners 504 are selectably tunable and the modulators are fixed frequency modulators (i.e., each tuned to a channel that is assigned to the bridge circuit).

Though the bridge circuit is shown with only three ports, it could include more ports if conference calls involving more than three participants are desired. Whatever the number of ports, the bridge circuit would combine incoming video signals to produce the composite signal and then the composite signal to each of the conference call participants.

What is claimed is:

1. A video signal distribution hub for a video conferencing network in which workstations generate RF video signals, said hub comprising:

a plurality of workstation ports to which said workstations may be connected, each workstation port including an input line for receiving a video signal from a workstation connected thereto and an output line for sending a video signal to a workstation connected thereto;

a plurality of hub ports through which other hubs can be connected, each of said hub ports including an input line for receiving video signals from a hub connected to that port and an output line for sending video signals to the hub connected thereto;

a first circuit module generating an output signal for each of the workstation ports, said first circuit module combining all of the video signals received over the input lines of all of the workstation ports and all of the hub ports to generate a combined signal, wherein said first includes a distribution network receiving the combined signal and generating therefrom the output signal for each of the workstations ports; and a second circuit module including an RF amplifier for each of said hub ports, said RF amplifier for each hub port supplying its output to the output line for that hub port, and wherein for each of said hub ports said second circuit module combines the video signals received over the input lines of all of the workstation ports with the video signals received over the input lines of all of the other hub ports to generate a composite signal that is supplied to an input of the RF amplifier for that hub port.

2. The video signal distribution hub of claim 1 wherein the output signals for all of the workstation ports carry the same video information.

3. The video signal distribution hub of claim 1 wherein said distribution network comprises a plurality of transmitters, each of said plurality of transmitters connected to the output line of different workstation port, each of said plurality of transmitters comprising a tuner in series with a modulator.

4. The video signal distribution hub of claim 3 wherein the tuner in each of said plurality of transmitters is a fixed channel tuner.

5. The video signal distribution hub of claim 4 wherein the modulator in each of said plurality of transmitters is a fixed channel modulator.

6. The video signal distribution hub of claim 5 wherein the fixed channel modulator in each of said plurality of transmitters is set to the same channel.

7. The video signal distribution hub of claim 4 wherein the fixed channel tuner in each of said plurality of transmitters is tuned to a different channel.

8. The video signal distribution hub of claim 3 wherein the tuner in each of said plurality of transmitters is a channel selectable tuner.

9. The video signal distribution hub of claim 8 further comprising a central control unit that is connectable to a computer network and wherein the channel selectable tuner in each of said plurality of transmitters includes an input terminal for receiving a channel selection signal from the central control unit.

10. The video signal distribution hub of claim 3 wherein the first circuit module comprises a combining module that combines the video information contained in the video signals received over the input lines of all of the workstation ports to generate an intermediate signal.

11. The video signal distribution hub of claim 10 wherein the second circuit comprises a combiner circuit for each hub port, wherein the combiner circuit for each hub port combines the intermediate signal with the video signals received over the input lines of all of the other hub ports to generate the composite signal for that port.

12. The video signal distribution hub of claim 3 wherein the first circuit module further comprises a plurality of receivers, each of said plurality of receivers connected to the input line of different workstation port, each of said plurality of receivers comprising a tuner in series with a modulator.

13. The video signal distribution hub of claim 12 wherein the tuner in each of said plurality of receivers is a fixed channel tuner.

14. The video signal distribution hub of claim 13 wherein the fixed channel tuner in each of said plurality of receivers is set to the same channel.

15. The video signal distribution hub of claim 12 wherein the modulator in each of said receivers is a channel selectable modulator.

16. The video signal distribution hub of claim 15 further comprising a central control unit that is connectable to a computer network and wherein the channel selectable modulator in each of said plurality of receivers includes an input terminal for receiving a channel selection signal from the central control unit.

* * * * *

UNITED STATES PATENT AND TRADEMARK OFFICE
CERTIFICATE OF CORRECTION

PATENT NO.   : 5,491,508

DATED        : February 13, 1996

INVENTOR(S)  : Mark Friedell, et al.

It is certified that error appears in the above-identified patent and that said Letters Patent is hereby corrected as shown below:

Col. 9, line 10, after "first", insert --circuit module--

Signed and Sealed this

Tenth Day of December, 1996

Attest:

BRUCE LEHMAN

Attesting Officer

Commissioner of Patents and Trademarks